United States Patent [19]

Smith et al.

[11] Patent Number: 5,134,705
[45] Date of Patent: Jul. 28, 1992

[54] SYSTEM AND METHOD FOR CONCURRENCY SIMULATION

[75] Inventors: Robert C. Smith, Downingtown; William C. Hopkins, Exton, both of Pa.

[73] Assignee: Unisys Corporation, Blue Bell, Pa.

[21] Appl. No.: 260,638

[22] Filed: Oct. 21, 1988

[51] Int. Cl.⁵ ............................................. G06F 9/45
[52] U.S. Cl. ................................ 395/700; 364/DIG. 1
[58] Field of Search ... 364/200 MS File, 900 MS File

[56] References Cited

U.S. PATENT DOCUMENTS

| | | | |
|---|---|---|---|
| 4,432,051 | 2/1984 | Bogaert et al. | 364/200 |
| 4,435,758 | 3/1984 | Loric et al. | 364/200 |
| 4,466,061 | 8/1984 | DeSantis et al. | 364/200 |
| 4,468,736 | 8/1984 | DeSantis et al. | 364/200 |
| 4,502,118 | 2/1985 | Hagenmaier, Jr. et al. | 364/200 |
| 4,583,164 | 4/1986 | Tolle | 364/200 |
| 4,807,115 | 2/1989 | Torng | 364/200 |
| 4,809,159 | 2/1989 | Sowa | 364/200 |
| 4,825,360 | 4/1989 | Knight, Jr. | 364/200 |
| 4,847,755 | 7/1989 | Morrison et al. | 364/200 |

OTHER PUBLICATIONS

W. Daniel Hillis and Guy L. Steele, Jr., *Data Parallel Algorithms*, Communications of the ACM, Dec. 1986, vol. 29, No. 12, pp. 1170–1183.

Primary Examiner—Joseph A. Popek
Assistant Examiner—Rebecca L. Rudolph
Attorney, Agent, or Firm—Mark T. Starr; Roland B. Desilets; Mervyn L. Young

[57] ABSTRACT

A system and method which assumes that the process being evaluated is written in a highly concurrent language or at least is capable of high degree of concurrent operations. The parameters employed in the simulated concurrent performance have a direct affect on performance time.

8 Claims, 9 Drawing Sheets

|   | SKI Expression Evaluation | | SASL Program |
|---|---|---|---|
| 1 | evaluate | *if* (> 4 3) | *if* (> 4 3) 1 0 |
| 2 | evaluate | > 4 3 | *if* (> 4 3) 1 0 |
| 3 | result | TRUE | *if* TRUE 1 0 |
| 4 | evaluate | *if* TRUE | *if* TRUE 1 0 |
| 5 | result | K | K 1 0 |
| 6 | evaluate | K 1 0 | K 1 0 |
| 7 | result | 1 | 1 |

Fig. 5

| | Event | SKI Node Number | Combinator or Value | Description |
|---|---|---|---|---|
| 1 | Eval | — | 7316 | start program (Figure 1) |
| 2 | StepD | 7316 | | search left for combinator |
| 3 | BegCombRed | 7314 | if | found if combinator |
| 4 | Eval | 7314 | 7310 | evaluate condition |
| 5 | StepD | 7310 | | search left for combinator |
| 6 | BegCombRed | 7309 | > | found > combinator |
| 7 | Eval | 7309 | 7307 | evaluate left operand (4) |
| 8 | Return | — | 7307 | return value in 7307 (4) |
| 9 | Eval | 7310 | 7308 | evaluate right operand (3) |
| 10 | Return | — | 7308 | return value in 7308 (3) |
| 11 | CombRed | — | > | complete > reduction, result TRUE (Figure 2) |
| 12 | Return | — | TRUE | value of condition |
| 13 | CombRed | — | if | complete if reduction, result K (Figure 3) |
| 14 | BegCombRed | 7315 | K | found K combinator |
| 15 | Eval | 7315 | 7312 | evaluate strict first argument, in 7312 (1) |
| 16 | Return | — | 7312 | return value in 7312 (1) |
| 17 | CombRed | — | K | complete K reduction, result 1 |
| 18 | Return | — | 7312 | return value in 7312 (1), program complete |

Fig. 6

SYSTEM AND METHOD FOR CONCURRENCY SIMULATION

This invention was made with government support under contact No. F30602-86-C-0093 awarded by the U.S. Air Force. The government has certain rights in this invention.

BACKGROUND OF THE INVENTION

1. Field of the Invention

This invention relates to a system and method for concurrency simulation and particularly to such simulation of program routines written in a highly concurrent programming language.

2. Description of the Prior Art

In the design of parallel system architectures many degrees of freedom are available to the designer. However, it is difficult to search for empirical data about a broad class of parallel system architectures with an emphasis on identifying concurrency of the particular object code and to measure effectiveness of the identified concurrency involved for the exploitation of parallel architecture. An example of a processor design for exploiting concurrency in an ALGOL type machine language is disclosed in the DeSantis et al U.S. Pat. No. 4,466,061 where ALGOL type languages are normally considered to be sequential and nonconcurrent.

There are programming languages in existence today which are considered to be highly concurrent such as purely functional LISP which is based on the lambda calculus of A. Church. However, in its practical implementation, commercial LISP takes on many sequentializing features that cause it to lose a high degree of its concurrency. A particular language, as a readable alternative to pure LISP, is the St. Andrews Static Language or SASL which was proposed by David A. Turner (*SASL Language Manual*, University of St. Andrews, 1976). This language can be implemented by employing a number of "combinators" and also primitive functions which transform SASL source code into a notation in which bound variables do not occur to produce a variable-free object code (D. A. Turner, "A New Implementation Technique for Applicative Languages", *Software-Practice and Experience*, Volume 9, pgs. 31-49, 1979).

Such programs may be said to be demand driven in that only those functions are evaluated as are necessary. Such programs may be executed by a network of processors operating either simultaneously or independent of one another. Programs written in such a language are readily implemented in a parallel system providing that some systematic method is obtained for the identification of concurrency which is exploitable on a parallel architecture.

It is, then, the object of the present invention to provide an improved system and method for the simulation of concurrency that can be identified in various programming languages.

It is another object of the present invention to provide such a system and method for the simulation of concurrency in programs written in highly concurrent languages.

It is a further object of the present invention to identify concurrency available in various programs and programming languages for exploitation on parallel system architectures.

SUMMARY OF THE INVENTION

In order to accomplish the above identified objects, the present invention is directed towards a system and method for receiving a sequence of object code for a particular process to be executed, executing that object code while creating a history of the steps of execution which history steps are stored either in memory or a cache and so forth, running a program which inserts into the history steps points where concurrency can occur and then simulating the concurrent performance of the history steps with its insertions to produce a concurrent performance of the object code. A time record is kept for the execution according to certain restrictions defined by parameters describing the processing system on which the object code is to be executed.

The system and method of the present invention assumes that the process being evaluated is written in a highly concurrent language or at least is capable of high degree of concurrent operations and the parameters employed in the simulated concurrent performance have a direct affect on performance time. In this manner, the concurrent process being simulated can be executed on an appropriate parallel processing system according to its concurrent characteristics.

A feature, then, of the present invention resides in a system and method for running sequential object code of a program and denoting points of concurrency therein for simulation under processing system parameters of a parallel processing system.

BRIEF DESCRIPTION OF THE DRAWINGS

The above and other objects, advantages and features of the present invention will become more readily apparent from a review of the following specification when taken in conjunction with the drawings wherein:

FIG. 5. is a table representing an evaluation process as might be employed with the present invention;

FIG. 6 is a table of the evaluation process employed in the reduction of the directed graph of FIG. 4.

GENERAL DESCRIPTION OF THE INVENTION

The concepts of the present invention deal with a description of the history of the behavior of the system under study according to a particular model of concurrency. The model, specified, affects the entire method, and is supported by the system. In particular, it specifies the points in the computation at which concurrency can be exploited by a parallel system. These significant points in the computation are identified by the annotations, and only the occurrence of these points is recorded in the behavior description.

The present invention is directed toward a system and method for evaluating, by simulation, concurrency in various programs and processes particularly in a highly concurrent language although it may be in any program language. The particular highly concurrent language employed in the present embodiment of the invention is the SASL language described above. The present invention has also been employed to simulate a natural language parser program written in Prolog (see Hirschman et al, *Logic Programming, Proceedings of the Fifth International Conference and Symposium*, Vol. 1., pages 263-279, MIT Press, 1988.

The implementation technique proposed by Turner (supra) employs a set of operators which may be either primitive functions such as add, subtract, and so forth, or combinators S, K, I, and so forth, which are higher order non-strict functions in the sense that they can return a result even though one or more of their arguments is not evaluated. These combinators are formally defined by substitution rules as follows:

$$
\begin{aligned}
Sfgx &= fx(gx) \\
Kxy &= x \\
Yh &= h(Yh) \\
Cfgx &= (fx)g \\
Bfgx &= f(gx) \\
Ix &= x \\
\text{cond true } x\, y &= Kx\, y \\
\text{cond false } x\, y &= I\, y \\
\text{plus } mn &= m+n
\end{aligned}
$$

where m, n must already have been reduced to numbers

The S combinator, when applied to two functions, f and g, of a single argument x, results in the function f(x) being applied to g(x); the K combinator, when applied to one argument as a function of a second argument, results in the first argument. In addition, other combinators are postulated such as B and C combinators which are combinations of the S and K combinators. The I combinator is an identity combinator. Other combinators and their definitions are to be found in the above-referenced Turner publication.

The definitions of these various combinators serve as substitution rules by which an expression may be evaluated by progressive substitution to reduce the expression to a final result. The substitution rules then serve to form a type of compiler by which an expression to be evaluated can be translated to a machine operable code, and the present invention is directed toward simulation of a reduction processor and the operating code therefor for implementing an applicative program language of the type described by Turner.

Figure 1A:
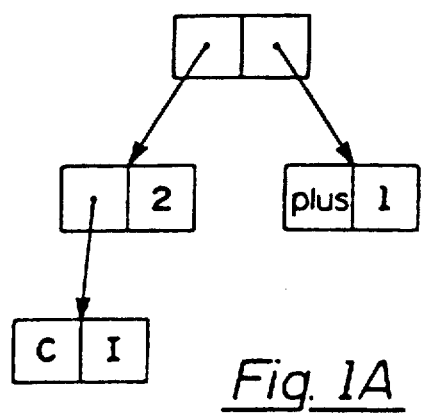
FIGS. 1A, B, C and D represent tree-like graphs which may be employed with the present invention.

A brief example of how the SASL program simulation by the present invention operates is illustrated in FIGS. 1A, B, and C. This illustration is for the evaluation of the expression: successor of 2, where the successor function is defined as suc $x = 1 + x$. This compiles to the code: CI2(plus 1) where the C and I are two of the combinators described above. The reduction processor being simulated by the present invention progressively transforms this expression as follows:

I(plus 1) 2 using the C-rule,
Plus 1 2 using the I-rule,
3 using the plus rule.

Figure 1B:
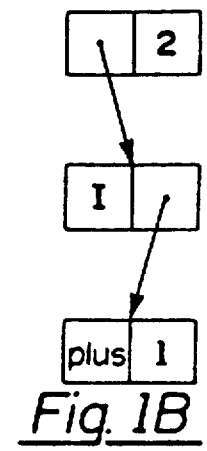
Figure 1C:
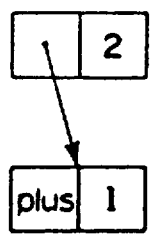
Figure 1D:

In the present embodiment, various programs or sequences of expressions to be evaluated are stored in memory as graphs built of two-cell nodes where each cell includes either a value or a pointer or a combinator or a primitive function. FIG. 1A shows a plurality of such cells in which the above compiled expression code is stored where the arrows represent pointers or addresses to related cells. FIG. 1B illustrates the storage cell arrangement after the first transformation given above. FIG. 1C illustrates the cell arrangement after the second transformation specified above. FIG. 1D illustrates the storage cell arrangement after the third transformation with the final result.

In this manner, incoming expressions are transformed into combinators which are stored as binary trees with nodes representing functional applications. The reduction processor being simulated then proceeds to evaluate the expression through progressive transformations until a result is achieved. Furthermore, as was indicated above, it can be theoretically shown that different expressions can be evaluated independently or concurrently of one another so as to accommodate a network of such processors each of which may be simultaneously evaluated for executing different portions of a program or different programs.

The function of the reduction processor is to reduce the S-K graphs of which FIGS. 1A, . . . , D are but an example. These graphs are so referred to because of the principal substitution rules that were described above. This reduction results in a series of output values or functions. The result of a sequence of such reductions is independent of the order in which the reductions are carried out, subject to the constraint that on a given graph some reduction orders may terminate whereas others may not. Thus, the reductions normally can be performed in any order and readily lend themselves to a concurrent network of such reduction processors, one or more of which may be operating on the same graph, in which case the reduction scheme is referred to as a multi-thread reduction scheme.

The present example uses a single-thread reduction scheme known as a normal-order reduction, in which the leftmost instance of a reduction rule, present at each step, is evaluated. The reduction process traverses left subtrees of the graph until it encounters an operator. The appropriate reduction rule is applied and the left subtree of the transformed graph is again traversed.

Figure 2A:
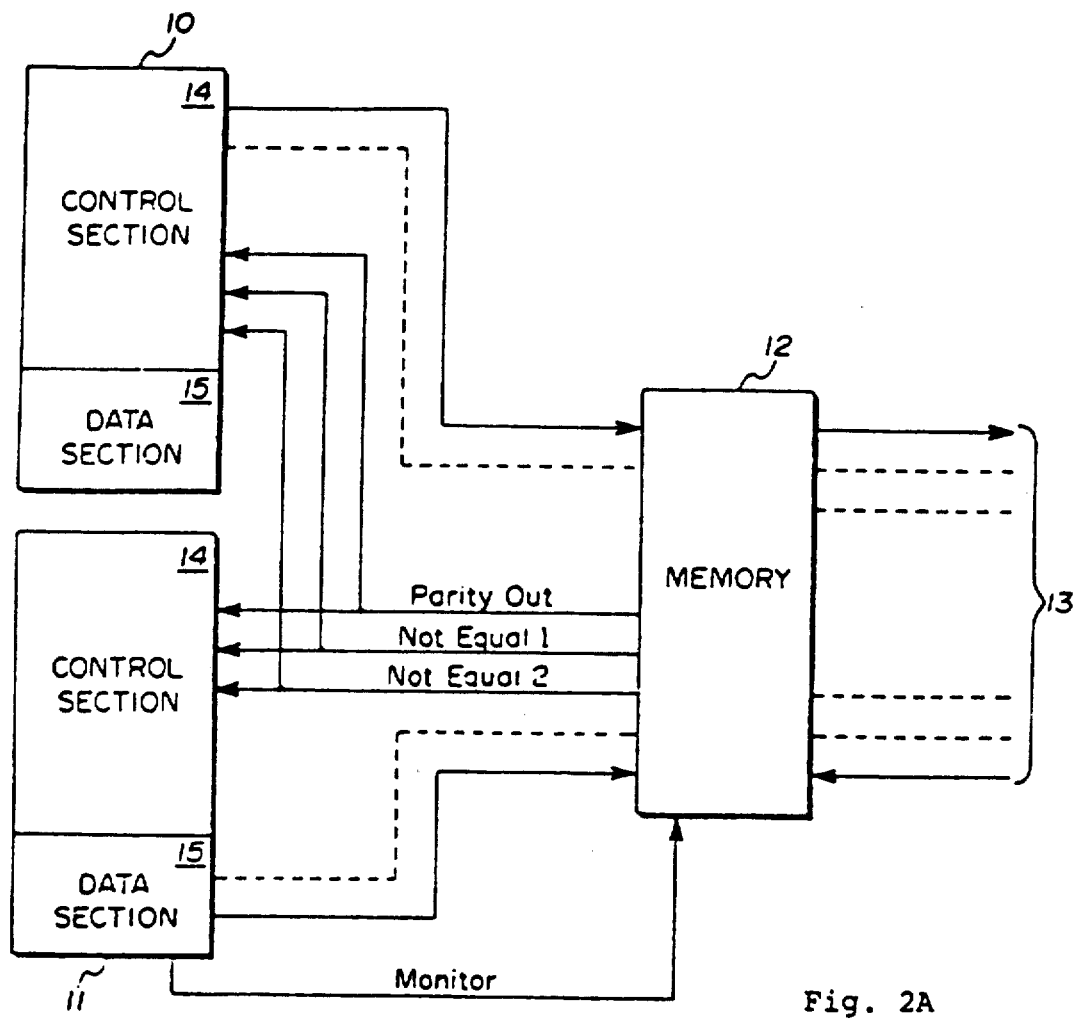
FIGS. 2A and 2B represent different embodiments of concurrent systems for which processes are simulated by the present invention.
Figure 2B:
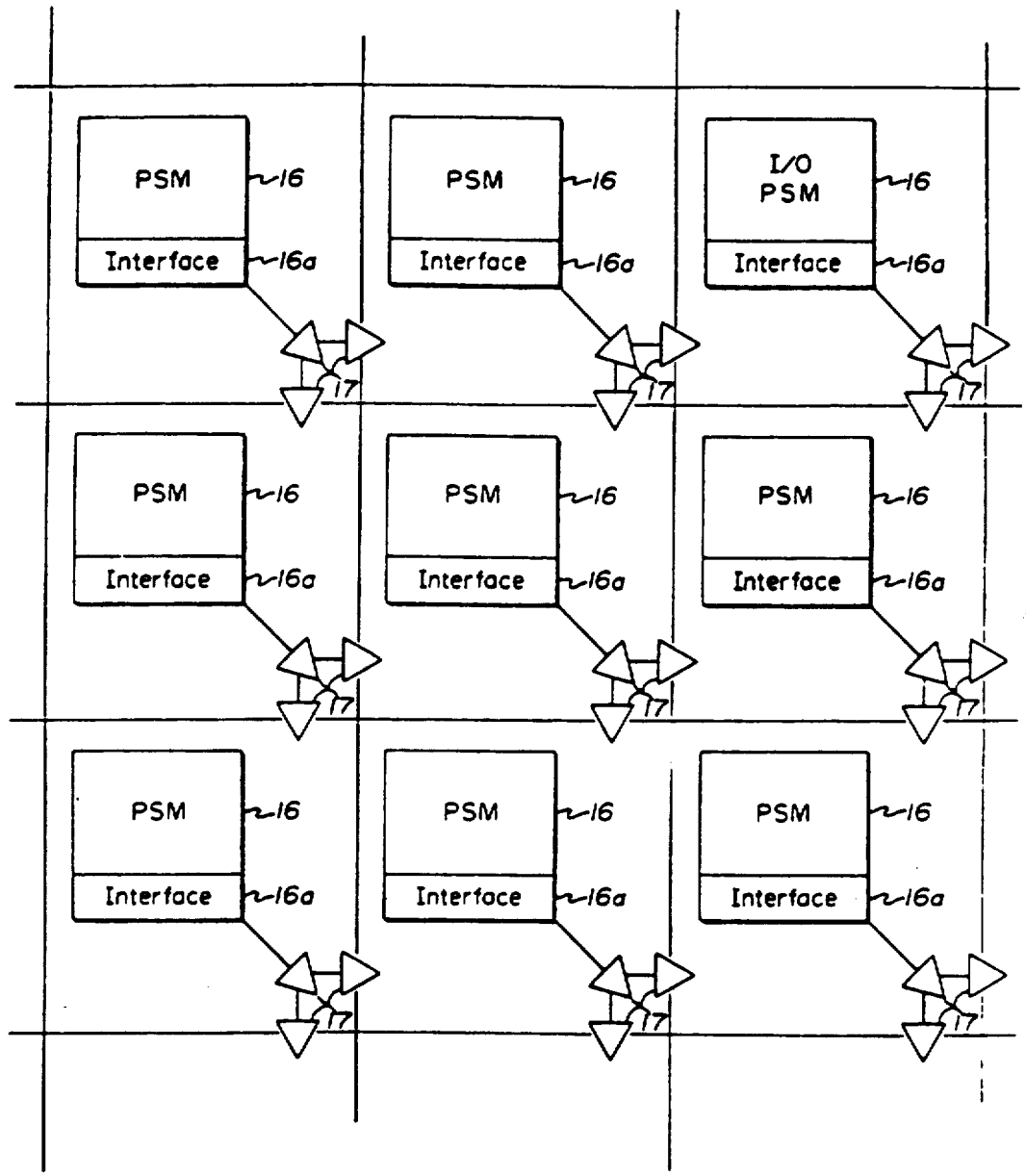
Figure 3:
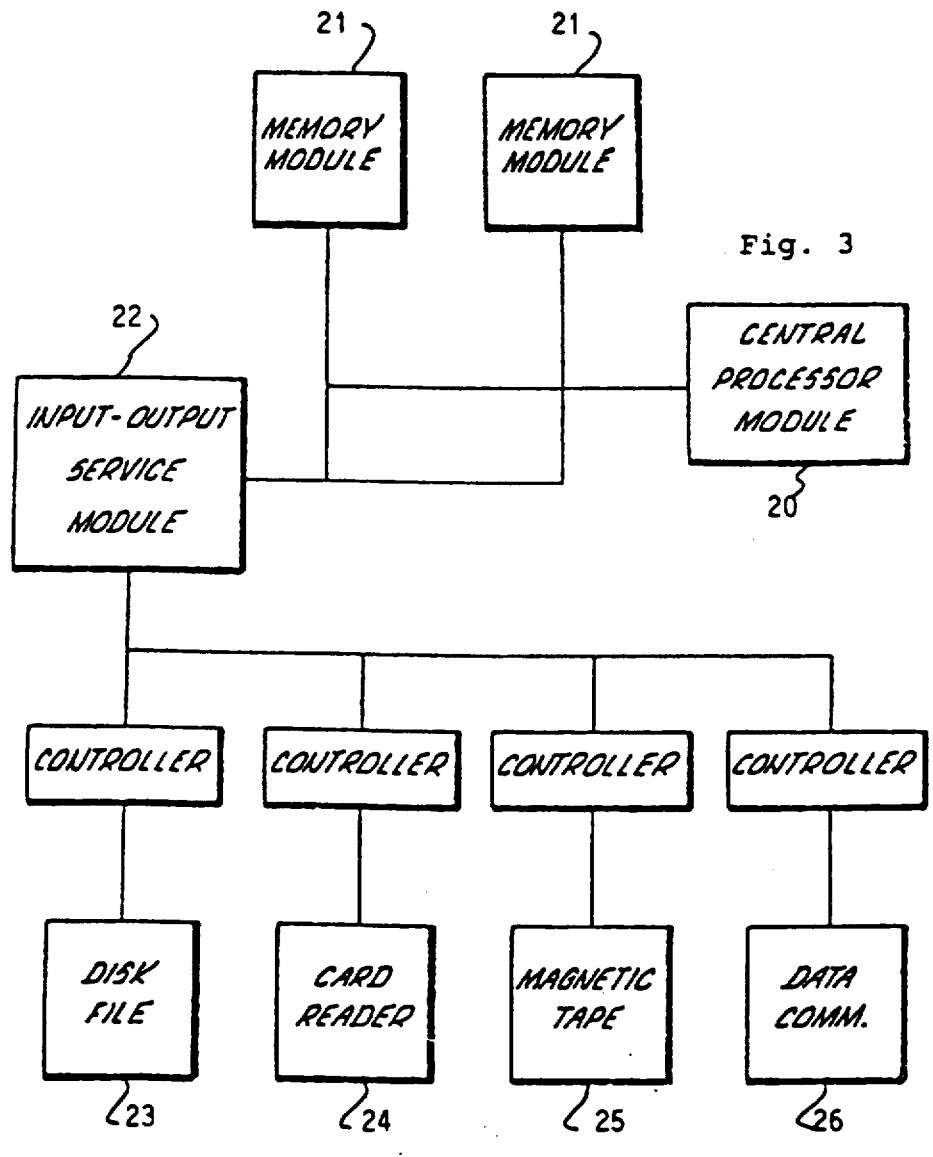
FIG. 3 is a diagram of a general processing system on which the present invention may be implemented.

One type of multiprocessing system for concurrent execution is illustrated in FIG. 2A where there are two processors 10, 11 which communicate with memory 12 that in turn communicates with outside world by way of interface 13. Processors 10, 11 each consists of a control section 14 and a data section 15. A fully concurrent network of processor storage modules (PSM) is illustrated in FIG. 2B wherein the processor storage modules 16 are coupled together by a nearest neighbor switching network that is formed of network nodes 17. The concurrent processing systems of FIG. 2A and FIG. 2B are more throughly discussed in the Hagenmaier, Jr. et al U.S. Pat. No. 4,502,118. In that patent, and related patents, the processors are particularly designed for reduction of directed graphs that result from the compilation of the SASL language described above. The present system and method is designed to simulate various programs written in such a highly concurrent language, although programs in more conventional languages can benefit from the present invention. The system and method of the present invention are implemented in a standard data processing system of FIG. 3 in which central processor module 20 is coupled to memory modules 21 and to input-output service module 22. Input-output service module 22 in turn is coupled to various input-output devices such as disk file 23, card reader 24, magnetic tape drive 25 and data communications module 26.

As was indicated above the present invention employs a series of routines for receiving a sequence of object code for a particular process to be executed (first compiling the source language code if it has not already been compiled), executing that object code while creating a history of the steps for the execution of that object code, running a program to insert points of concurrency within the history so that plural subroutines can be executed in a multiprocessing environment according to certain parameters which describe a particular processing system.

DETAILED DESCRIPTION OF THE INVENTION

As has been described above, the present invention is designed primarily for programs written in highly concurrent languages although it can be applied to programs written in any language. The highly concurrent language being simulated in the description of the present invention is SASL which is a variation of pure LISP.

The present description will be in terms of a small program fragment:

if (4>3) then 1 else Q

This expression when written in SASL is:

4>3→1;0

Figure 4:
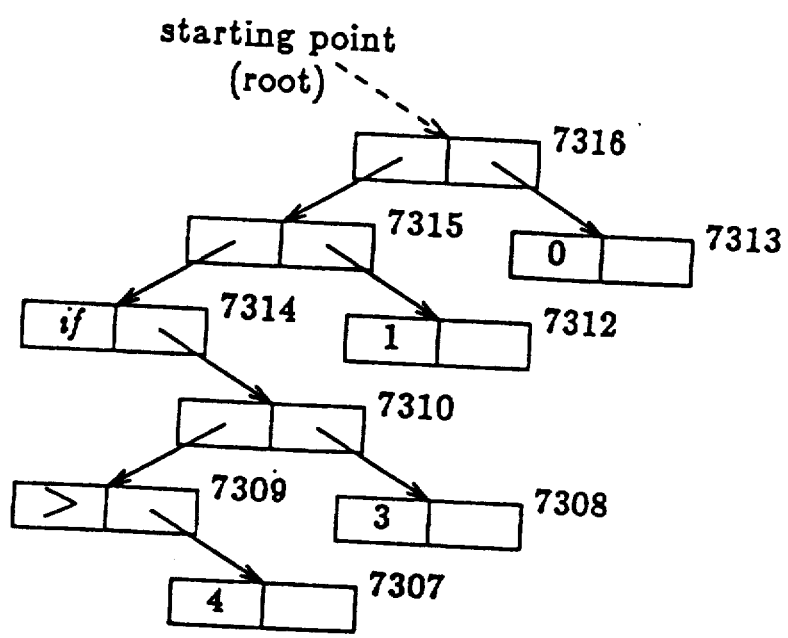
FIG. 4. is a tree-like graph for a particular example as described in the specification.

When this SASL routine is compiled it results in the directed graph illustrated in FIG. 4. The labels 7307 through 7316 indicate memory locations containing nodes of the graph and arrows being pointers or memory addresses. As shown therein, the if combinator is just a combination of the condition true and the condition false combinators described above. The > operation is just an arithmetic comparison operation. Both of these combinators (e.g. if, >) drive the program evaluation according to Turner's reduction algorithm which specifies normal-order reduction, meaning leftmost reductions are done first. In this example, the directed graph of FIG. 4 has its left subgraph searched until the if combinator is found and so forth. The end result is the production of the value 1. The reduction process employed is illustrated in the table of FIG. 5 and is similar to the reduction process described in relation to FIGS. 1A, B, C and D.

As has been indicated above, the present invention executes the compiled SASL graph and provides a record of the events summarizing that execution, from which record, information as to points of concurrency can be obtained. This produces an event trace as illustrated in FIG. 6 which is the history of evaluation steps performed during the first running or evaluation of the SASL program. The events listed therein are carried out in sequential order and are: evaluate the compiled program, step down to left and search for a combinator, begin combinator reduction when the if combinator is found, and so forth. It is believed that the remaining events in FIG. 6 will be self evident.

Figure 7:
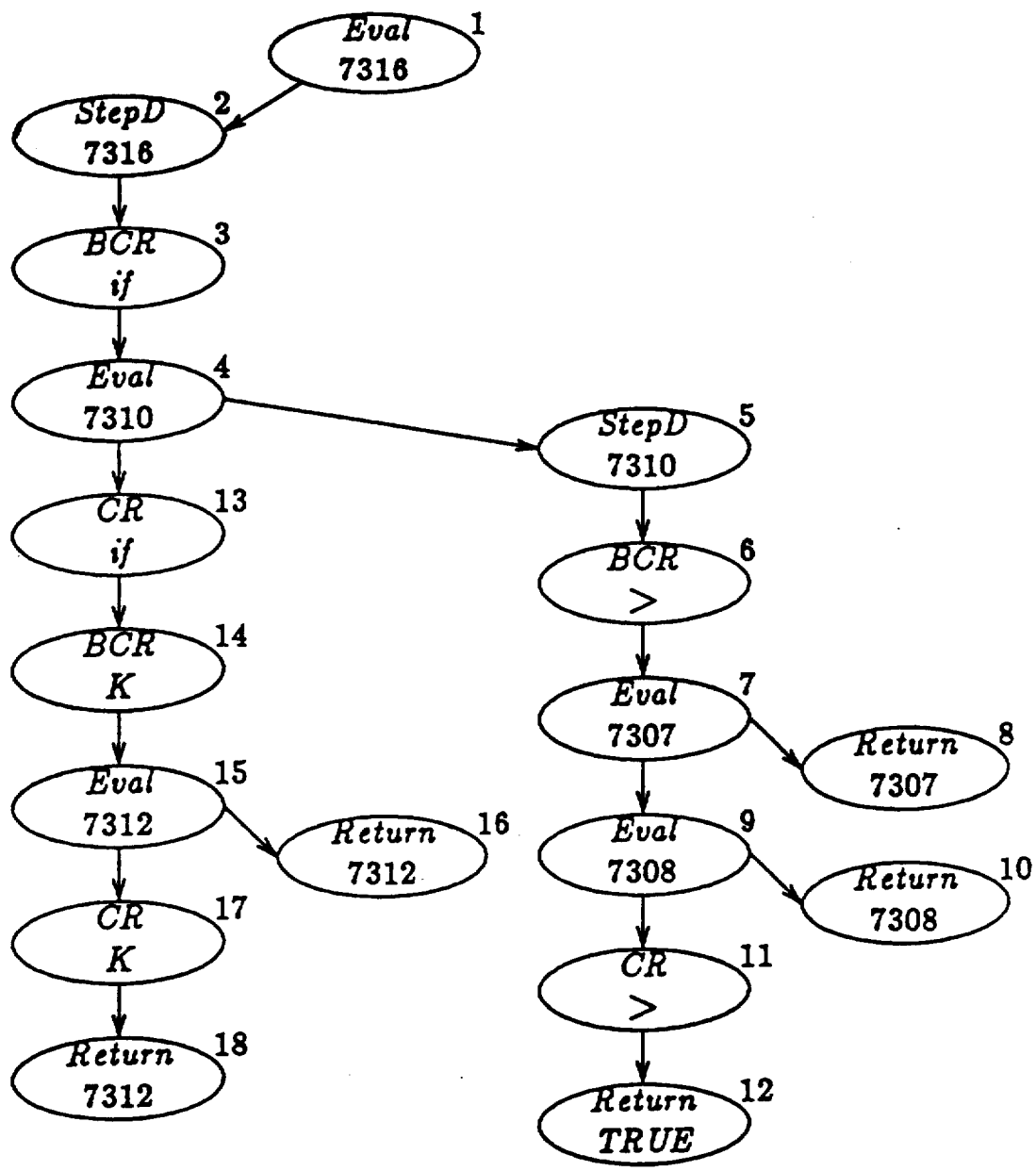
FIG. 7. is a tree-like graph representing an abstract behavior description of the process of FIGS. 5 and 6.

The event history of FIG. 6 (or event trace) can be transformed into another directed graph for the evaluation process, where each node represents an event (and the processing preceding the event) as shown in FIG. 7. The directed graph of the evaluation process provides a more easily manipulated structure. Arcs emanating from a node show the exit paths following simulation of an event. The Eval nodes contain two exit arcs: the "branch" arc (pointing to the right) is followed first to simulate argument evaluation, and a Return at the end of the branch causes the simulation to return to the Eval node and then to follow the other arc (down). It will be noted that the nodes of FIG. 7, as well as the events of FIG. 6 are sequential and thus the graph of FIG. 7 really represents a program that can be run on a sequential machine.

The sequential version of the program routine as represented by FIGS. 6 and 7 applies to a configuration of a single processor where no concurrency is generated. Other configurations should be able to spawn processes to evaluate arguments before they are demanded in the reduction process (although concurrency will not be limited to concurrent evaluation of arguments). The sequence of FIG. 7 is not regenerated in order to simulate different concurrency policies, thus avoiding the time and expense of simulating full program reduction at the same time as simulating concurrency. This "factoring" of the overall simulation process is a principal advantage of the present invention.

Figure 8:
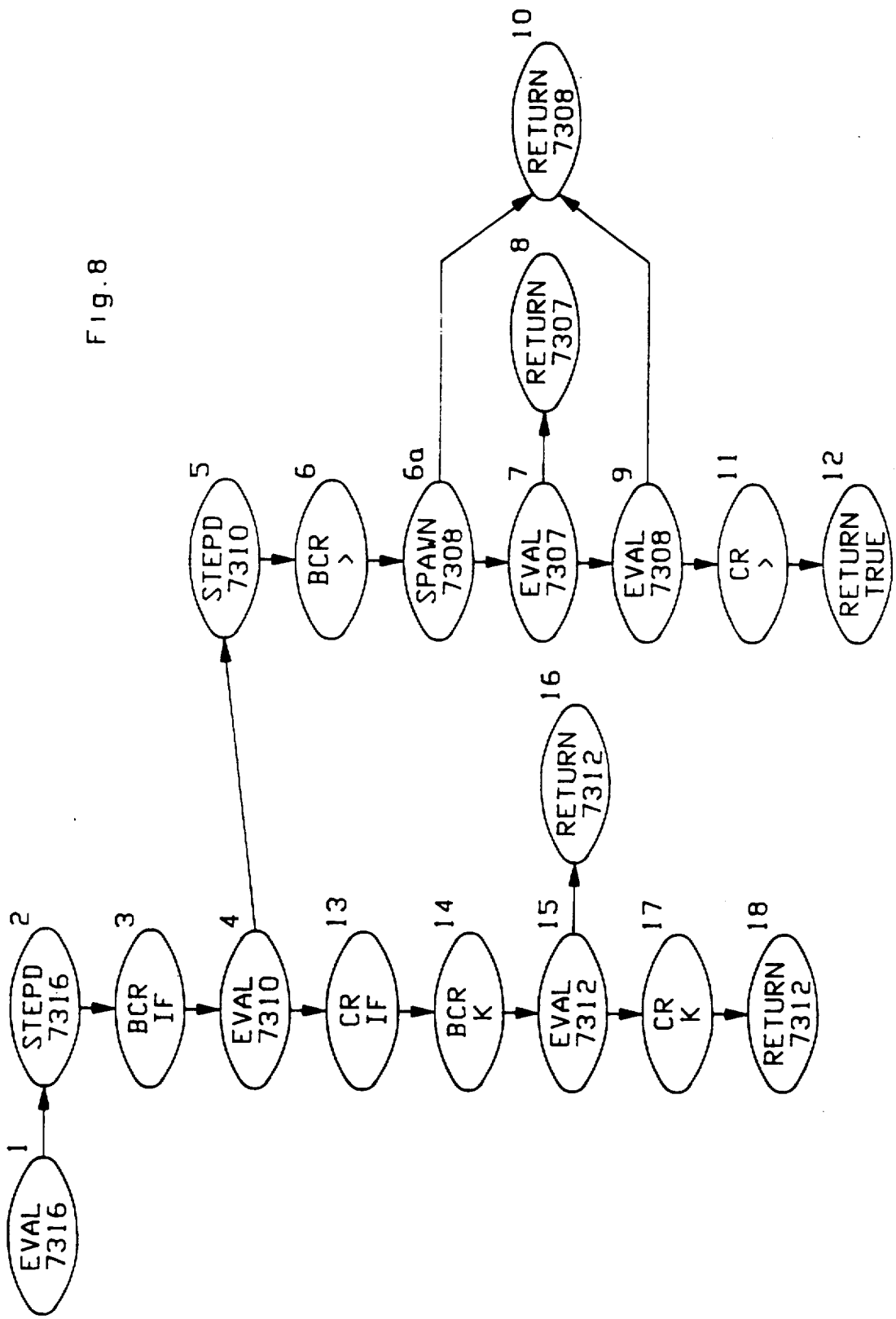
FIG. 8. is another abstract behavior tree-like graph representing a concurrent evaluation of the process of FIG. 5.

One concurrency model for SASL is for a given combinator to spawn the evaluation of multiple strict arguments which are required for the reduction of the combinator. This may occur in a system configuration such as FIG. 2A where two processors share a single memory. In this example, the combinator > has two strict arguments (4 and 3). An event directed graph for this system is shown in FIG. 8. Spawning occurs immediately after the begin combinator reduction (BCR) event (node 6) in the behavior description of FIG. 7. In the event graph, for this model and system architecture, as shown in FIG. 8, the spawn event (node 6a) succeeds node 6. Node 6a specifies the spawning of a process to simulate node 10 representing the evaluation of the second argument (numeral 3). Node 9, representing the demand for the second argument in the reduction process, also points to node 10. Ideally, before arrival of node 9, the prior spawning of node 10 produces the result. The graph of FIG. 8 represents the results of the reinterpretation procedure listed below.

In this example, points where concurrency may be exploited exist where combinators require multiple strict arguments to complete the reduction. Once the combinator to be reduced is identified (the BegCombbRed event) the strict arguments are known and may be evaluated concurrently. The routine scans the history of execution for the BegCombRed events with multiple strict arguments, and inserts a spawn event for each strict argument (except the first which is evaluated within the parent process) with a pointer to the sequence of events in the history representing the arguments evaluation.

With an ALGOL type language of the DeSantis patent (supra), concurrency can occur when an operator does not require results from immediately previous operations. In the parsing of a natural language, concurrency can occur, for example, when a subject has two or more predicate definitions.

The rerunning or reinterpretation procedure of FIG. 8 is listed below in pseudo code, the actual code being in C Language:

```
PROCEDURE REINTERP;
BEGIN
    READ_NEXT_EVENT(EVENT);
    WHILE (NOT_END_OF_FILE) DO
        IF (EVENT = BEGIN_COMB_REDUCTION) THEN
```

```
            /*START OF A REDUCTION*/WRITE(EVENT);
            IF (MULTIPLE_STRICT_ARG_COM-
            BINATOR(EVENT)
            THEN
            FOR I IN 2. .NUMBER_OG_STRICT_ARGS
            LOOP WRITE (SPAWN_EVENT);
            SAVE_SPAWN_POSITION;
            /*MUST FIX POINTER
            TO  */END  FOR;   /*EVENTS IN
            SPAWNED PROCESS*/
            END IF;
        ELSE IF (EVENT_EVALUATION_NODE) THEN
            WRITE(EVENT);
            IF (PAST_FIRST_EVAL) THEN
                FIX_UP_SPAWN;
            END IF;
            SET_PAST_FIRST_EVAL;
            REINTERP; /*RECURSIVELY HANDLE BODY OF
            ARGUMENT EVALUATION*/
        ELSE IF
        (EVENT = COMPLETE_COMBINATOR_REDUCTION)
        THEN RESET_PAST_FIRST_EVAL;
        ELSE IF (EVENT - RETURN_EVENT) THEN
            WRITE(EVENT);   /* COMPLETES ARGUMENT
            REDUCTION*/
            RETURN;   /* RETURN TO PREVIOUS REINTERP
            PROCEDURE */
        ELSE
            WRITE(EVENT);
        READ_NEXT_EVENT(EVENT);
        END WHILE;
END REINTERP;
```

A timestamped record of the execution steps is the principal result of the simulation. From this timestamped record, which also contains information about the event, and processor executed on, all the information about an architecture's effectiveness is extracted. The record is produced as a result of an event being scheduled for a processor. When the internal clock reaches the event's scheduled time, the event is triggered causing an output record to be produced with the time, event, and processor information. Any successor events are scheduled and the simulation resumed. The effectiveness of a parallel system being simulated is measured by comparing the timestamp for the parallel system simulation with the timestamp for a purely sequential system evaluation.

The actual simulation procedure is listed below in pseudo code, the actual code being in C Language.

```
PROCEDURE SIMULATE(EVENT_LIST);
BEGIN
    EVENT := GET_NEXT_EVENT(EVENT_LIST)
    IF (EVENT_LIST_EMPTY) THEN
        RETURN;
    END IF;
    RUNNING_TIME := EVENT.TIME;
    WRITE_TIMESTAMPED_RECORD;
    CASE EVENT
    EVALUATION:  PUSH_ON_RETURN_STACK
                 (SECOND_SUCCESSOR);
                 INSERT_INTO_EVENT_LIST
                 (ARGUMENT_SUCCESSOR);
                 SIMULATE(EVENT_LIST;
    RETURN:      POP_SUCCESSOR_FROM_RE-
                 TURN_STACK
                 (NEXT_EVENT);
                 SIMULATE(EVENT_LIST);
                 BREAK
    SPAWN:       IF (AT_MAX_PROCESSORS) THEN
                     ADD_TO_PROCESS_QUEUE
                     (SPAWN_SUCCESSOR);
                 ELSE
                     CREATE_&_SCHED-
                     ULE_NEW_PROCESS
                     (SPAWN_SUCCESSOR);
                 END IF;
                 INSERT_INTO_EVENT_LIST
                 (CURRENT_PROCESS_SUCCESSOR);
                 SIMULATE(EVENT_LIST);
                 BREAK;
    DEFAULT:     /*SINGLE SUCCESSOR,
                 JUST SCHEDULE IT */
                 INSERT_INTO_EVENT(SUCCESSOR);
                 SIMULATE(EVENT_LIST);
    END CASE;
END SIMULATE;
```

The simulation routine (as distinct from the actual simulation) includes the system parameters of the parallel system being evaluated. In the simulation code listed above, the number of processors available and execution delays are contained in the SPAWN step.

The examples given herein are for the explanation of the system and method of the present invention and are too trivial to produce any real increase in throughput since the arguments are already evaluated (4 and 3). If the arguments to > were complex arithmetic expressions, simultaneous evaluation of both arguments produce a more noticeable speed increase.

EPILOGUE

A system and method has been described above for simulating concurrent operations to be performed by the execution or evaluation of various types of programs and particularly programs written in a highly concurrent language such as functional languages and also logic languages. Such a simulation process provides an indication of how to use a parallel or concurrent processing system having a plurality of processors. The system and method of the present invention first simulates the program routine or a segment thereof in a sequential manner and stores data containing a history of execution and indicating points of concurrency that may exist in the routine.

While but one embodiment of the present invention has been described, it will be apparent to those skilled in the art that variations and modifications may be made therein without departing from the spirit and scope of the invention as claimed.

What is claimed is:

1. In a data processing system having a memory, a first processor coupled to said memory and an input/output device coupled to said memory, a method of simulating concurrent execution by a parallel processor system of a routine written in a given program language having points of concurrency therein, said method comprising:

(a) transmitting to said first processor from said memory, a sequence of code of said routine expressed in said given program language, which routine is to have its concurrent execution by said parallel processor system simulated;

(b) executing said sequence of code for a given set of input data and storing a sequence of steps employed in said code execution;

(c) recording information related to said execution of said sequence of code associated with each of said steps including the time required therefore;

(d) reading said stored sequence of steps via said first processor and determining points of concurrency via said first processor where parallel execution of said code may be performed;

(e) entering a first set of insertions into said stored sequence of steps at a plurality of said points of concurrency to specify separate subroutines for parallel execution;

(f) defining said parallel processor system including the number of processor elements employed in said parallel processor system and the execution delay associated with spawning a new process; and (g) performing a first simulation via said first processor of the execution of said routine as a plurality of subroutines executed by said defined parallel processor system using said stored steps, said insertions, and said recorded information.

2. A method according to claim 1 further comprising the step of:

(h) measuring the performance of said first simulation.

3. A method according to claim 2 wherein:
said program language is a functional language and said points of concurrency occur when a combinator requires evaluation of two or more strict arguments.

4. A method according to claim 2 wherein:
said programming language is an ALGOL type language and said points of concurrency occur when an operator does not require results of immediately previous operations.

5. A method according to claim 2 wherein:
said routine is a natural language parser and said points of concurrency occur when a subject has two or more predicate definitions.

6. A method according to claim 2 further including the steps of:
performing a second simulation via said first processor of the execution of said routine, said second simulation comprising the steps of repeating said steps (f), (g), and (h) using a second definition of said parallel processor system which alters the manner in which said defined parallel processor system performs; and comparing said measurements of said first simulation to said measurements of said second simulation.

7. A method according to claim 2 further comprising the steps of:
performing a second simulation via said first processor of the execution of said routine, said simulation comprising the steps of repeating said steps (d), (e), (g), and (h) for a second set of insertions which alters the method of concurrency employed; and comparing said measurements of said first simulation to said measurements of said second simulation.

8. A method according to claim 1 wherein:
said first processor is a sequential processor.

* * * * *